United States Patent [19]

Bornemann

[11] 4,176,966

[45] Dec. 4, 1979

[54] MIXING APPARATUS

[75] Inventor: Hans-Joachim Bornemann, Vellmar, Fed. Rep. of Germany

[73] Assignee: Thyssen Industrie Aktiengesellschaft, Essen, Fed. Rep. of Germany

[21] Appl. No.: 921,261

[22] Filed: Jul. 3, 1978

[30] Foreign Application Priority Data

Jul. 5, 1977 [DE]  Fed. Rep. of Germany ....... 2730283

[51] Int. Cl.² ............................................ B01F 15/00
[52] U.S. Cl. ...................................... 366/78; 366/256; 366/289; 366/332
[58] Field of Search .................. 366/78, 83, 228, 231, 366/255, 256, 286, 289, 331, 332; 425/208, 219

[56] References Cited

U.S. PATENT DOCUMENTS

| 3,023,455 | 3/1962 | Geier et al. | 425/8 |
| 3,458,894 | 8/1969 | Wheeler | 366/78 |
| 3,841,611 | 7/1972 | Ronner | 366/78 |

*Primary Examiner*—Leonard D. Christian

*Attorney, Agent, or Firm*—Becker & Becker, Inc.

[57] ABSTRACT

A mixing apparatus for continuously preparing pulverous to granular thermoplastic synthetic material. The mixing apparatus includes a tubular, rotatably mounted horizontal container, on the inner surface of which mixing instruments or tools are attached. An inlet and outlet for the material to be mixed are respectively located near the ends of the container. A shaft is rotatably arranged about the axis of the container and extends at least over the entire length of the container. Mixing instruments are likewise attached to the shaft. The mixing instruments, in the region between the inlet and outlet, comprise a plurality of sections of single or multi-threaded worms which extend in the radial direction from the shaft to the inner surface of the container. These sections are adjacent to and spaced from one another, and are alternately mounted to the shaft and to the inner surface of the container. The shaft is longitudinally displaceable with regard to the container, and the container and shaft may be rotated in opposite directions to one another.

5 Claims, 3 Drawing Figures

MIXING APPARATUS

The present invention relates to a mixing apparatus for continuously preparing pulverous to granular thermoplastic synthetic material. The mixing apparatus has a tube-like, rotatably mounted container, on the inner surface of which are mounted mixing instruments. An inlet and outlet for the material to be mixed are located near the ends of the container. A shaft is rotatably arranged around the axis of the container and extends at least over the entire length of the container. Mixing instruments are likewise fastened on this shaft.

A heretofore known proposal for a mixing apparatus provides a stationarily arranged container with the mixing instruments arranged therein, and provides a thin shaft with blades attached thereto. The container and the mixing instruments are operated through the intervention of a differential. Thus, the upwards conveying tool of the inner mixing instrument and the downward conveying tool located on the inner wall of the container operate in opposite directions (German Offenlegungsschrift No. 1,454,798). A drawback to this known apparatus is the arrangement of the tools or instruments, with the tools being arranged at great intervals and remaining respectively far from the walls which they face. This leads to zones in which the material to be mixed cannot be reached by the tools, so that a uniform and intensive energy output by means of the friction between the tools and the material which is to be prepared and mixed is not guaranteed.

It is therefore an object of the present invention to design the form and arrangement of the mixing tools or instruments, and the mixing space, for a mixing apparatus of the above described general type, in such a way that the materials being mixed, without the possibility of accumulating in dead zones, can be automatically subjected to a continuous preparation, the duration and intensity of which may be controlled.

This object and other objects and advantages of the present invention will appear more clearly from the following specification in connection with the accompanying drawing, in which.

The mixing apparatus according to the present invention is characterized primarily in that the mixing tools or instruments, in the region between the inlet and the outlet, comprise sections of single or multi-threaded worms which extend in the radial direction from the shaft up to the inner wall of a horizontal container. The worms are arranged in a plurality of sections spaced from one another, and are alternately mounted on the shaft and on the inner surface of the container. The mixing apparatus according to the present invention is further characterized in that the shaft is mounted so as to be lengthwise slidable in relation to the container.

The container and the shaft, rotatable independent of one another, are operable in the same and in opposite directions with infinite speed adjustment. The outer diameter of the shaft is 50 to 80% of the inner diameter of the container.

Figure 1:
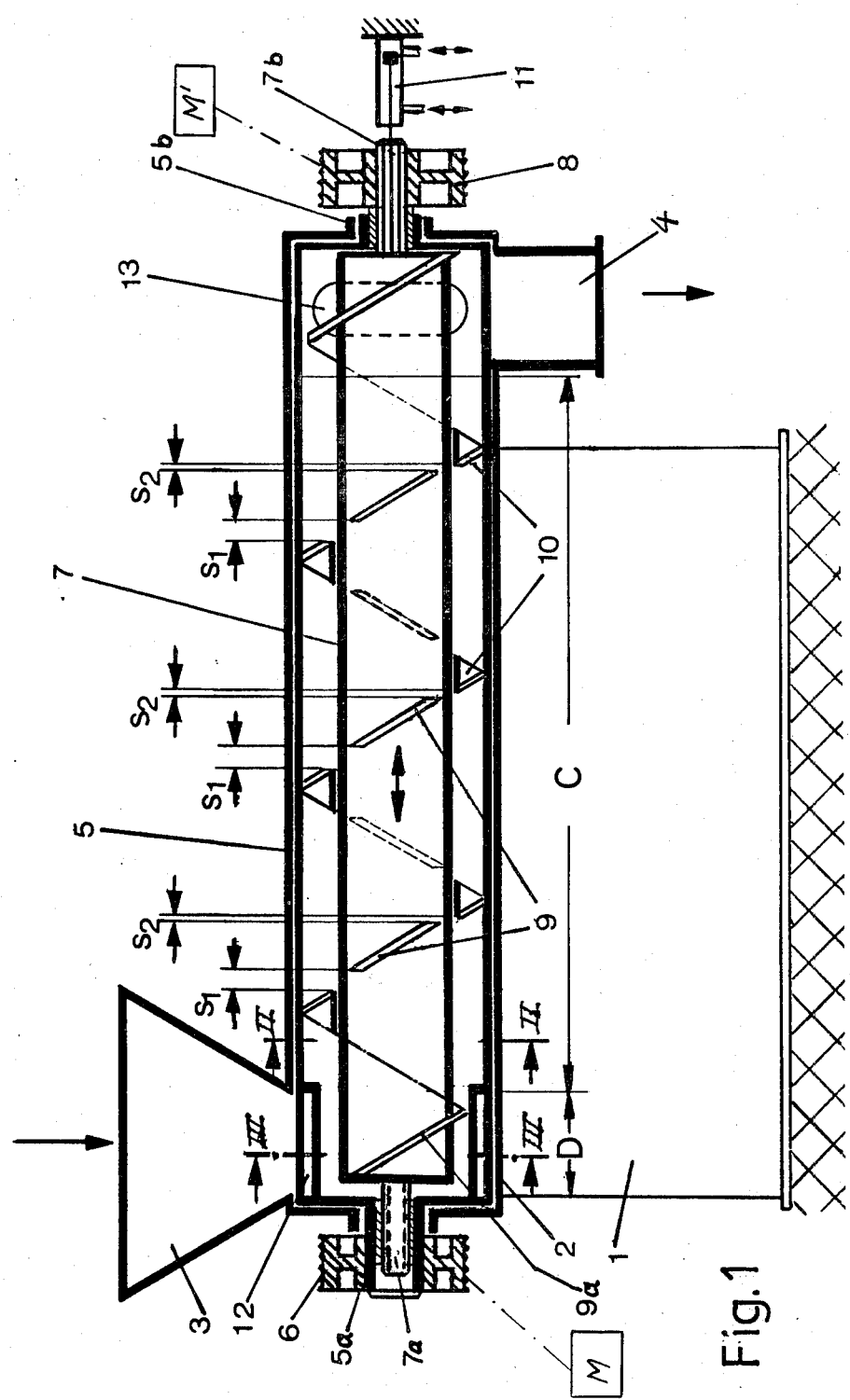
FIG. 1 is a side section through a mixing apparatus of the present invention.

Referring now to the drawings in detail, FIG. 1 shows a horizontal cylindrical housing 2 mounted on the stand 1. One end of the housing 2 is provided with a filling funnel 3, and the other end is provided with an outlet 4. A cylindrical container 5 is mounted in the cylindrical housing 2 by means of journals $5a$ and $5b$, which are respectively attached to both end faces of the container 5. A drive pulley 6 is attached to the journal $5a$. The drive pulley 6 is connected to a drive unit M by means of belts (not shown) for infinite speed adjustment. A shaft 7 having journals $7a$ and $7b$ is mounted in the region of the journals $5a$ and $5b$. A drive pulley 8, which is axially non-displaceable during operation, is in driving engagement with the journal $7b$, which is designed as a splined shaft. The drive pulley 8 is connected with a drive unit M' by means of belts (not shown) for infinite speed adjustment. Within the section C of FIG. 1, between the inlet below the filling funnel 3 and the outlet 4, blade-like instruments 9 or 10 are mounted on the shaft 7 and on the inner surface of the container 5.

Figure 2:
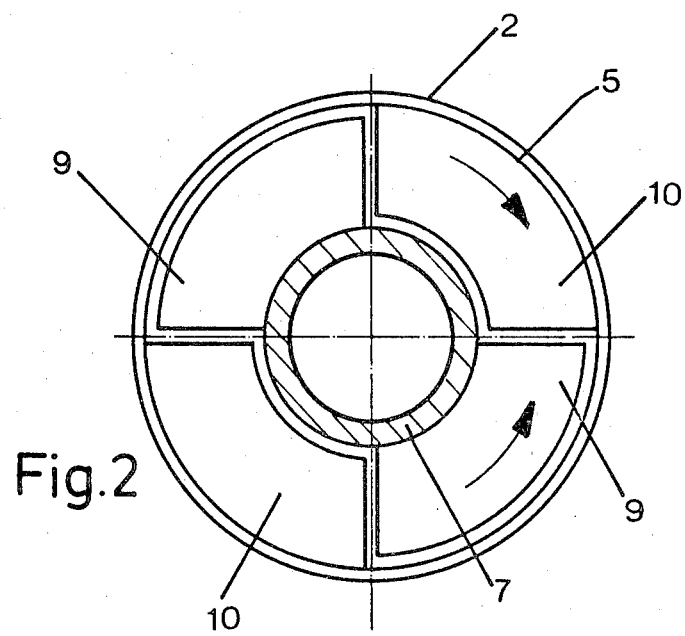
FIG. 2 is an enlarged view of a section taken along the line II—II of FIG. 1.

In the specific embodiment of FIGS. 1 and 2, these instruments 9 or 10 comprise sections of a single-threaded worm which extends in the radial direction from the shaft 7 to the inner surface of the container 5. These sections, which are spaced from one another, are alternately mounted on the shaft 7 and on the inner surface of the container 5. Gaps are provided between these sections of tools 9 and 10 in the axial direction, as shown in FIG. 1 at $S_1$ and $S_2$. The shaft 7 is slidable in the axial direction by means of the journal or splined shaft $7b$ and a piston-cylinder arrangement 11 which engages the journal $7b$, so that the width of the gaps $S_1$ and $S_2$ can be selectively varied ranging from a small working gap up to a gap having a maximum width of $S = S_1 + S_2$. Thus, for example, the width of the gap $S_1$ can be increased if the width of the gap $S_2$ is decreased.

Figure 3:
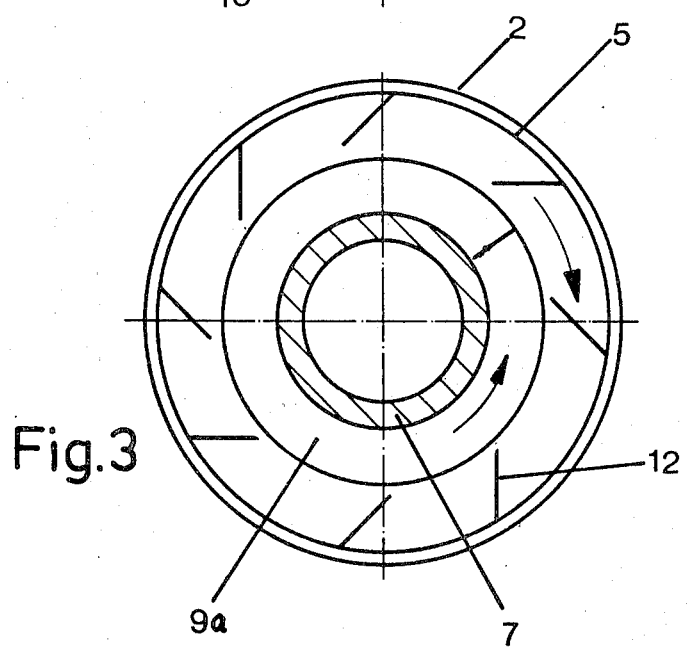
FIG. 3 is an enlarged view of a section taken along the line III—III of FIG. 1.

In the region D of FIG. 1, the container is provided on its periphery with a plurality of slots. As shown in FIG. 3, the longitudinal webs 12 remaining between these slots are angled off toward the interior of the housing in such a way that during rotation of the container 5 they aid in drawing in the material which is to be mixed and is supplied from the filling funnel 3.

In the region of the longitudinal webs 12, the worm sections $9a$ located on the shaft 7 are designed as drawing-in worms having a correspondingly reduced outer diameter.

For discharging the material to be mixed, a plurality of discharge slots 13 are provided in the circumferential direction of the rotatable container 5 in the region of the outlet 4.

The outer diameter of the shaft 7 should be about 50 to 80% of the inner diameter of the container 5. The thus produced annular mixing chamber avoids the occurrence of an accumulation or deposit of the material which is to be mixed.

The operation of the shaft 7 and the container 5 is effected continuously and in opposite directions for the mixing process. In this connection, the speed of the shaft 7 should be slightly greater than the speed of the container 5. In this way, with a continuous movement of the instruments of the shaft 7 and of the container 5 in opposite directions to one another, an advancement of the material which is to be mixed is achieved in a direction toward the outlet. Accordingly, the duration and temperature of the material which is to be mixed can be controlled by the selection of the difference in speed. By changing the gaps $S_1$ and $S_2$, the degree of shearing of the material to be mixed between the instruments or tools which rotate past one another can be controlled.

The advantages achieved with the mixing apparatus according to the present invention consist in that a good mixing and dispersion can be achieved in a relatively short horizontal container by means of tools or instruments which operate in opposite directions, together with a variable gap width between the instruments which rotate past one another. In addition, accumulations in the mixer are avoided.

By the selection of suitable speeds, the adjustment of the difference in speed, and the adjustment of the gap, all temperatures and durations for the material to be mixed can be achieved in a simple manner for the processing or preparation of pulverous to granular thermoplastic synthetic materials.

The present invention is, of course, in no way limited to the specific showing of the drawings, but also encompasses any modifications within the scope of the appended claims.

What is claimed is:

1. A mixing apparatus for continuously preparing thermoplastic synthetic material in pulverous to granular form, which apparatus comprises in combination:
   a tubular, rotatable, horizontal container having two ends;
   inlet means associated with one of said ends of said container for supplying said material to said container;
   outlet means associated with the other one of said ends of said container for the discharge of said material from said container;
   a shaft rotatably and concentrically arranged within said container, said shaft extending at least substantially over the entire length of said container and being longitudinally displaceable with respect to said container;
   first mixing instruments attached directly to the inner surface of said container and extending radially inwardly up to the outer surface of said shaft; and
   second mixing instruments attached directly to said shaft and extending radially outwardly up to the inner surface of said container, said first and second mixing instruments, between said inlet and outlet means, forming a plurality of complementary sections of an at least single-threaded worm particularly having a conveying effect upon said material simultaneously with continuously preparing and mixing the material without any accumulator effect, said sections, in the longitudinal direction of said shaft, being attached alternately to said shaft and to the inner surface of said container, adjacent sections in said longitudinal direction being spaced from one another.

2. A mixing apparatus in combination according to claim 1, in which said container and said shaft are rotatable relative to one another in the same and opposite directions.

3. A mixing apparatus in combination according to claim 2, in which the outer diameter of said shaft is 50 to 80% of the inner diameter of said container.

4. A mixing apparatus in combination according to claim 2, in which drive unit means for the shaft and container to be rotatable independent of one another and for infinite speed adjustment therewith are provided.

5. A mixing apparatus in combination according to claim 1, in which the first and second mixing instruments are identically embodied worm elements having the conveying effect upon the synthetic material in pulverous to granular form with warmth arising during friction therebetween both due to differing speed of said container and said shaft and also due to said shaft being longitudinally displaceable with respect to said container so that all desired mixing material temperatures are adjustable by the frictional warmth without additional external heating.

* * * * *